June 17, 1941.                W. DAWIHL ET AL                2,246,165
        METHOD FOR PRODUCING SINTERED HARD METAL FROM PULVERULENT MATERIALS
                          Filed May 27, 1939
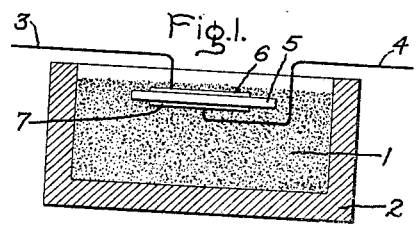
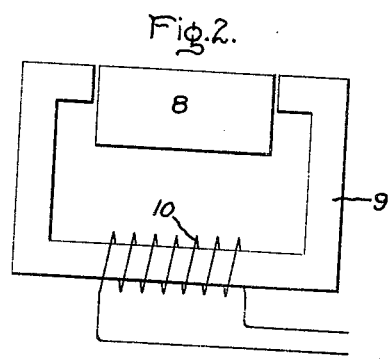
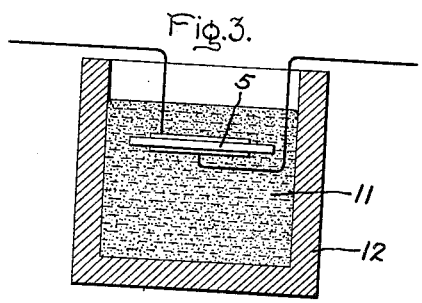
Inventors:
Walther Dawihl,
Hermann Franssen,
by Harry E. Dunham
Their Attorney.

Patented June 17, 1941

2,246,165

UNITED STATES PATENT OFFICE 2,246,165

METHOD FOR PRODUCING SINTERED HARD METAL FROM PULVERULENT MATERIALS

Walther Dawihl, Berlin-Kohlhasenbruck, and Hermann Franssen, Essen, Germany, assignors to General Electric Company, a corporation of New York Application May 27, 1939, Serial No. 276,222
In Germany August 27, 1938

6 Claims. (Cl. 75—137)

Our invention relates to the production of sintered hard metal from pulverulent starting materials.

In the production of sintered hard metal bodies intended to be used as working implements and tools the starting materials are in pulverulent condition which after having been mixed together are pressed to the desired shape and thereupon are solidified by heating the pressed bodies to an elevated temperature. In order to obtain bodies of the most uniform possible nature, the pulverulent starting materials have to be mixed with one another as intimately as possible. Consequently, the operation of intermixing the various pulverulent materials in the usual mixing apparatus, such as ball mills, requires comparatively much time in order to obtain a satisfactorily intimate intermixing of the particles. This intimate intermixing of the pulverulent particles is desirable, further, after the powder mixture has been filled into the press mold, as preparation of the pressing operation, in order to obtain pressed bodies which are entirely free of cavities.

According to our invention this desirable intimate intermixing of the pulverulent particles very easily and conveniently is obtained by exposing the starting powders within the mixing device and/or within the press mold to the action of supersonic oscillations.

The novel features which are characteristic of our invention are set forth with particularity in the appended claims. Our invention, however, will best be understood from reference to the following specification when considered in connection with the accompanying drawing in which Fig. 1 is a cross sectional view of a mold containing powders to be mixed in accordance with our invention; Fig. 2 shows diagrammatically and in elevation an apparatus for effecting the mixture of powdered materials by magnetostriction, while Fig. 3 is a cross sectional view of a tank containing a liquid and pulverized materials to be mixed in accordance with our invention.

In carrying out our invention, we have found, for example, that when in the production of tungsten carbide a mixture of powdered tungsten and carbon is exposed 60 minutes to the action of supersonic oscillations of a frequency of 350 kHz., the same intimate intermixing is obtained as by grinding the materials 24 hours in a ball mill without application of supersonic waves. The same good results are observed in mixing tungstic acid with soot and in mixing tungsten carbide or titanium carbide with cobalt.

For the above-mentioned preparation of the pressing operation for example, we fill a usual powdered mixture 1 of carbides of metals of high fusion point, such as tungsten or titanium, and auxiliary metals, such as cobalt, iron or nickel, into an iron mold 2 and subject the mixture in the mold, before pressure is applied thereto, for some minutes to the action of supersonic oscillations, for example of 350 kHz. produced by connecting the terminals 3 and 4 of a vibratory body consisting of a quartz crystal 5 and metal plates 6 and 7 to a suitable source of high frequency current. This action of supersonic oscillations has the effect that the pulverulent particles within the mold slip together and come into a much more intimate mutual contact whereby formation of bridges and cavities or a deposition of non-uniform density is eliminated. When pressure is exerted subsequently upon the powdered mixture so treated, a much more uniform compression and thus a considerable reduction of these defects is obtained.

In carrying out our new process we may proceed by making the container intended to receive the materials to be mixed or the mold for the mixture to be compressed therein, of a material which acts as bearer for the supersonic action by magneto-striction. In such an arrangement a mold or container 8 with powdered materials therein is supported in any convenient manner between the poles of an electromagnet 9, as indicated in Fig. 2, the winding 10 of the electromagnet being connected in a suitable high frequency circuit. If desired the materials to be mixed may be suspended in a liquid 11 contained in a suitable tank 12 and the oscillating quartz 5 immediately brought into contact with the liquid. Preferably the liquid used is of a nature such as not to exert an oxidizing effect, as for example acetone.

What we claim and desire to secure by Letters Patent is:

1. In the production of sintered hard metal bodies from pulverulent starting materials by mixing them, compressing the mixture in molds, and sintering the shaped bodies thus produced: said mixing being accomplished by subjecting said materials previous to the compressing operation to the action of supersonic oscillations.

2. In the production of sintered hard metal bodies from pulverulent starting materials by mixing them, compressing the mixture in molds, and sintering the shaped bodies thus produced:

said mixing being accomplished by subjecting said materials within a mixing device to the action of supersonic oscillations.

3. The process for producing sintered hard metal bodies from pulverulent starting materials which comprises mixing said materials by subjecting the materials for about one hour to oscillations having a frequency of about 350 kilo hertz, compressing the mixture in a mold and sintering the shaped body thus produced.

4. In the production of sintered hard metal bodies from pulverulent starting materials by mixing them, compressing the mixture in molds, and sintering the shaped bodies thus produced: said mixing being accomplished by subjecting said materials within a mixing device and subsequently within said mold to the action of supersonic oscillations.

5. In the production of sintered hard metal bodies from pulverulent starting materials by mixing them, compressing the mixture in molds, and sintering the shaped bodies thus produced: said mixing being accomplished by suspending said materials to be mixed in a liquid and subjecting them therein to the action of supersonic oscillations.

6. In the production of sintered hard metal bodies from pulverulent starting materials by mixing them, compressing the mixture in molds, and sintering the shaped bodies thus produced: said mixing being accomplished by suspending said materials to be mixed in a liquid having no oxidizing effect thereon and subjecting them therein to the action of supersonic oscillations.

WALTHER DAWIHL.
HERMANN FRANSSEN.